S. C. ANKER-HOLTH.
THRUST BEARING.
APPLICATION FILED APR. 28, 1913.

1,096,524.

Patented May 12, 1914.

UNITED STATES PATENT OFFICE.

SEVERIN C. ANKER-HOLTH, OF PORT HURON, MICHIGAN.

THRUST-BEARING.

1,096,524. Specification of Letters Patent. Patented May 12, 1914.

Application filed April 28, 1913. Serial No. 763,956.

*To all whom it may concern:*

Be it known that I, SEVERIN C. ANKER-HOLTH, a citizen of the United States, residing in Port Huron, in the county of St. Clair and State of Michigan, have invented certain new and useful Improvements in Thrust-Bearings, of which the following is a specification.

This invention relates to bearings or steel supporting members for cream separator spindles and spindles provided therewith.

The principal object of the invention is to provide a cream separator or centrifugal machine, with a rotary spindle or shaft and a removable bottom supporting member or steel point adapted to extend into the bottom of and support the shaft in such a manner as to avoid spreading or distortion of the shaft, and further provide a spindle and a reversible steel point which are durable, economical and efficient in construction and operation.

Other and further objects of the invention will appear from an examination of the drawings, and from the following description and claims.

The invention consists in the features, combinations, and details of construction herein described and claimed.

Figure 1:
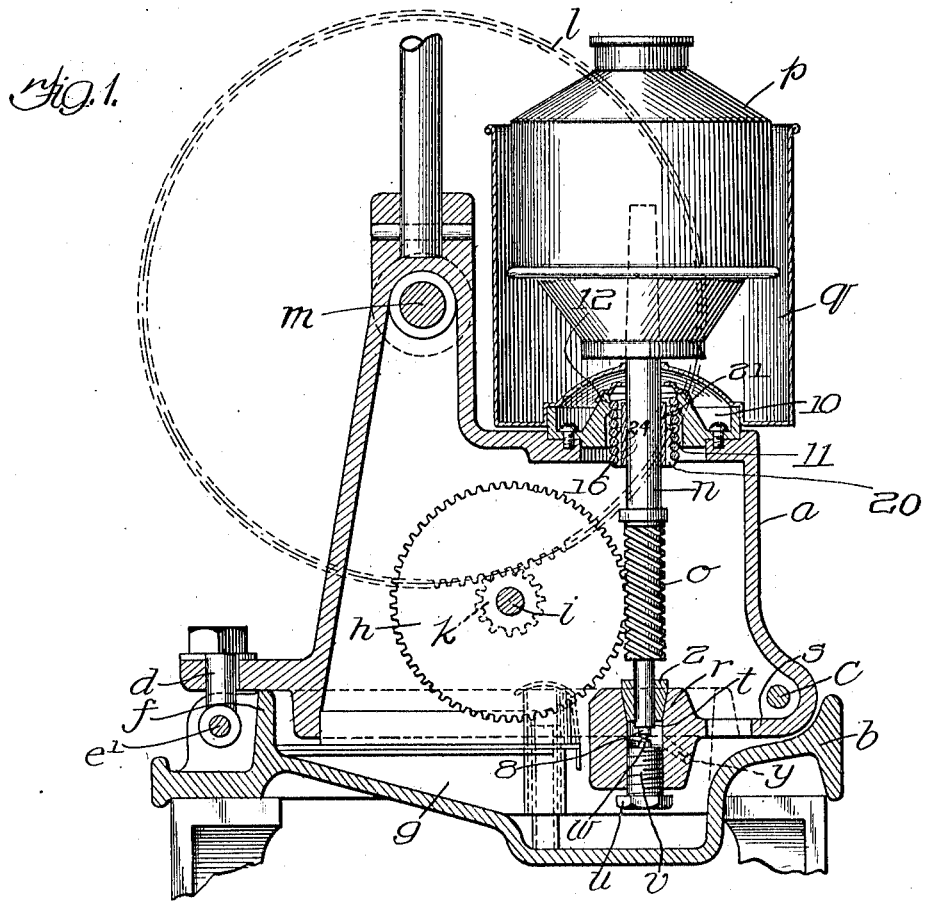
Figure 2:
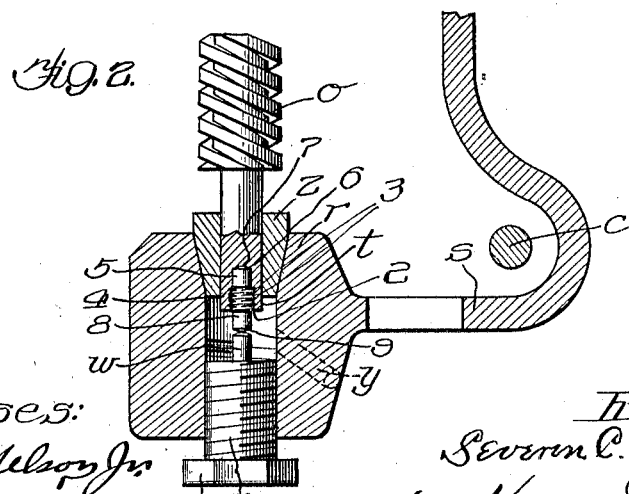

In the accompanying drawings, Figure 1 is a view in vertical section of a cream separator provided with a spindle and bearing mechanism constructed in accordance with my invention and improvements; and Fig. 2, an enlarged detail view in vertical section of the bottom end of the spindle and bottom bearing, showing the reversible steel pin or bearing member in threaded engagement with the inner end surface of the spindle and its outer end projecting below the end of the spindle proper, and in engagement with a bearing member mounted in a stationary support.

In constructing a cream separator or centrifugal machine having a spindle and spindle bearing mechanism made in accordance with my invention and improvements, I provide a main cream separator frame $a$, supported by and pivotally connected with a base $b$ by means of a pivot or hinge $c$, and having a catch or securing bolt $d$ connected with the fixed base by means of a pivot or hinge $e$, and located on the opposite side of the base from the hinge $c$, for securing the main frame in operative position upon the base. The base is provided with an upwardly extending rim or flange portion $f$, and is dished or concave, so as to form an oil-containing chamber $g$, into the oil-containing portion of which extends a worm wheel $h$, mounted on a driving or counter shaft $i$, which is provided with a pinion $k$ in toothed engagement with a main driving gear wheel $l$, which is mounted upon and rotatable with the main driving shaft $m$ journaled in the frame. A vertical spindle $n$ is rotatably mounted in the oil-containing portion of the chamber formed by the base and frame portion of the machine, and is provided with a worm $o$ in toothed engagement with the worm wheel $h$. A centrifugal separator bowl $p$, which may be of any desired type, is mounted upon the spindle $n$, and rotatable therewith, and is encircled by a casing $q$, which may be of any desired form, and constitutes no part of this invention.

In order to provide simple, economical and efficient bearings for the spindle, and an improved spindle having a bottom end portion and bearing constructed in accordance with my invention, I provide a bottom bearing which comprises in its construction a stationary bearing member $r$ located inside of the oil-containing portion of the oil chamber, and supported by an inwardly projecting portion $s$ of the frame, and having a central opening $t$ in which is mounted a threaded stationary bearing member $u$, having screw threads $v$ in threaded engagement with the threaded portion of the stationary bearing member $r$. Mounted in the threaded, adjustable bearing member $u$ is a steel point or bearing pin $w$, having a convex or spherical upper surface portion for supporting the spindle. The stationary bearing member $r$ is provided with an oil passage $y$ leading from the interior space or passage $t$ through the wall of the stationary bearing member $r$ and into the oil-containing portion of the oil chamber.

A tapered collar or sleeve $z$ encircles the lower end of the spindle and extends into the aperture $t$ in the member $r$, and is supported by the latter. The lower end of the spindle $n$ is provided with an axial opening 2, the lower end of which is provided with screw threads 3, and the upper portion of which aperture is cylindrical and without screw threads, and concentric with the axis of the shaft or spindle.

A steel point or bearing pin, having a central threaded portion 4, is mounted in threaded engagement with the threaded portion of the end opening in the spindle, and is provided with a cylindrical body portion 5 which extends into said end opening and has an end surface 6, (see Fig. 2) in supporting engagement with an inner end surface portion 7 of the spindle. This steel point or bearing pin is also provided with a like or identical cylindrical body portion 8, which projects beyond the end of the spindle, and has its bottom end surface in engagement with the bottom stationary bearing pin or member $w$, and is provided with an end bearing surface 9, adapted to engage the inner end surface 7 of the spindle when said bearing pin or rotatable bearing pin or member which is in threaded engagement with the spindle is inverted.

The parts 5 and 8 of the threaded rotatable bearing member above described, being cylindrical, and the end opening or aperture 2 in the spindle being cylindrical, it will be readily seen that the entire body and weight of the spindle and bowl is supported by the end surface portions of the spindle and said bearing member, respectively, and that the spreading of the spindle and the injurious effects of such spreading and distorting of the spindle upon the balancing of the spindle and bowl, which ordinarily accompany the use of the ordinary tapered bearing member and the ordinary or known tapered or conical end aperture in the spindle, and in which the weight of the spindle and bowl is supported by the tapered or conical side surfaces which tend to cause the spindle to spread and become distorted and out of balance, are dispensed with and obviated. It will also be readily apparent that the rotary bearing pin or member in threaded engagement with the bottom end of the spindle and having identical cylindrical end portions constructed as described, and extending in opposite directions from the threaded central portion of said bearing member or pin, is adapted to be inverted with facility, when the outer end portion is worn by friction to which the members are subjected in use, and that when so inverted, it will have substantially the same efficiency as a new bearing pin or member. A yielding bearing or upper neck bearing for the spindle comprises a stationary bearing 10 having an axial opening 11 for admitting the spindle therethrough. Located in the opening 11 is a helical spring 16. Said spring 16 is adapted to surround the spindle $n$ and is retained in position by having engagement with the threads 12 formed in the wall of said opening 11. A bearing sleeve or collar 20 encircles the spindle and extends inside of the spring 16, and has a non-threaded portion 21 of relatively small diameter, as compared with the inner diameter of the spring, and encircled by and out of engagement with the spring, and adapted to move transversely inside of and with the spring and in engagement with the spindle which is rotatable in the sleeve. The relatively large portion of the sleeve 20 has a peripheral thread 24 into which is screwed the helical windings of the spring 16. The spring and sleeve and the bearing comprising said elements are thus adapted to permit and yieldingly resist the transverse movements of the spindle.

I claim:

1. A cream separator spindle having a threaded axial opening in the bottom end thereof and having an inner supporting end surface on the inside of said opening, and a removable bearing member extending into said opening and in threaded engagement with the spindle and having an inner end surface in supporting engagement with said inner end surface of the spindle.

2. A cream separator spindle having a cylindrical axial opening in the bottom end thereof and having an inner supporting end surface on the inside of said opening, said opening having a screw-threaded portion and a non-threaded wall portion, and a removable screw-threaded bearing member in threaded engagement with the spindle and provided with a non-threaded cylindrical portion extending into said opening and having an end surface in supporting engagement with the inner supporting end surface of the spindle.

3. In a device of the class described, the combination of a spindle having a cylindrical axial opening in the bottom end thereof and having an inner supporting end surface on the inside of said opening, said opening having a screw-threaded wall portion and a non-threaded wall portion, a reversible bearing member having a screw-threaded central body portion in threaded engagement with the spindle and having non-threaded cylindrical end portions of equal dimensions, the upper end of said reversible bearing member being in engagement with the inner supporting end surface of the spindle, and a bearing member mounted on a stationary support and in supporting engagement with the bottom end of said reversible bearing member.

SEVERIN C. ANKER-HOLTH.

Witnesses:
T. S. SCUPHOLM, Jr.,
H. J. MOUTAUD.